US009407380B2

(12) United States Patent
Sundstedt et al.

(10) Patent No.: US 9,407,380 B2
(45) Date of Patent: Aug. 2, 2016

(54) MARITIME MACHINE-TO-MACHINE (M2M) APPLICATION PRIORITY MANAGEMENT

(71) Applicant: TELEFONAKTIEBOLAGET L M ERICSSON (PUBL), Stockholm (SE)

(72) Inventors: Bo Sundstedt, McKinney, TX (US); Eric Lee Valentine, Plano, TX (US); David Boltz, Garland, TX (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 104 days.

(21) Appl. No.: 14/527,942

(22) Filed: Oct. 30, 2014

(65) Prior Publication Data

US 2015/0118954 A1     Apr. 30, 2015

Related U.S. Application Data

(60) Provisional application No. 61/898,154, filed on Oct. 31, 2013.

(51) Int. Cl.
*H04B 7/00*     (2006.01)
*H04B 17/00*    (2015.01)
*H04W 4/00*     (2009.01)

(52) U.S. Cl.
CPC ........... *H04B 17/0022* (2013.01); *H04W 4/005* (2013.01)

(58) Field of Classification Search
None
See application file for complete search history.

(56) References Cited

U.S. PATENT DOCUMENTS

| 2011/0261891 | A1  | 10/2011 | Vos et al. |            |
|--------------|-----|---------|------------|------------|
| 2012/0084831 | A1* | 4/2012  | Hu         | H04L 63/20 |
|              |     |         |            | 726/1      |
| 2012/0263106 | A1* | 10/2012 | Lee        | H04W 4/005 |
|              |     |         |            | 370/328    |
| 2012/0281619 | A1* | 11/2012 | Tao        | H04W 4/005 |
|              |     |         |            | 370/328    |
| 2012/0282956 | A1* | 11/2012 | Kim        | H04L 12/5895 |
|              |     |         |            | 455/466    |
| 2012/0315874 | A1* | 12/2012 | Li         | H04L 65/102 |
|              |     |         |            | 455/411    |
| 2013/0077562 | A1  | 3/2013  | Boltz et al. |          |

(Continued)

FOREIGN PATENT DOCUMENTS

WO     WO 2012/042297 A1     4/2012

OTHER PUBLICATIONS

Qualcomm. Enhancing UL Access Control. 3GPP Draft; R2-131242 Enhancing UL Access Control, 3rd Generation Partnership Project (3GPP), Mobile Competence Centre; 650, Route Des Lucioles; F-06921 Sophia-Antipolis Cedex; France vol. RAN WG2, No. Chicago; 20130415-20130419 Apr. 6, 2013.

(Continued)

*Primary Examiner* — Dominic Rego
(74) *Attorney, Agent, or Firm* — Roger S. Burleigh (57) ABSTRACT

A network node communicates with a radio access node that communicates application traffic on behalf of machine-to-machine (M2M) devices via a satellite link. The network node comprises a database and a control unit. The database stores a plurality of recovery modes. Each recovery mode indicates one or more types of application traffic that M2M devices are or are not allowed to transmit when operating according to that recovery mode. The control unit detects a loss of communication across, or congestion on, the satellite link, selects one of the recovery modes, and requests the radio access node to broadcast the selected recovery mode over a 3GPP-based broadcast channel in order to instruct the M2M devices to transmit only application traffic allowed in accordance with the selected recovery mode.

14 Claims, 6 Drawing Sheets

(56) References Cited

U.S. PATENT DOCUMENTS

2014/0162684 A1* 6/2014 Shaw .................. H04W 4/02
                                                    455/456.1
2014/0351099 A1* 11/2014 Zhu .................. H04W 4/005
                                                    705/28

OTHER PUBLICATIONS

Asustek. Preventing RAN Overload in the Legacy Networks. 3GPP Draft; R2-122387 Preventing RAN Overload in the Legacy Networks, 3rd Generation Partnership Project (3GPP), Mobile Competence Centre; 650, Route Des Lucioles; F-06921 Sophia-Antipolis Cedex; France vol. RAN WG2, No. Prague, Czech Republic May 15, 2012.

Alcatel-Lucent, et al. Merits of the Slotted Access Methods for MTC. 3GPP Draft; R2-1122247, 3rd Generation Partnership Project (3GPP), Mobile Competence Centre; 650, Route Des Lucioles; F-06921 Sophia-Antipolis Cedex; France vol. Ran WG2, No. Shanghai, China. Apr. 5, 2011.

Alcatel-Lucent, et al. EAB for MTC Traffic. 3GPP Draft; R2-114275, 3rd Generation Partnership Project (3GPP), Mobile Competence Centre; 650, Route Des Lucioles; F-06921 Sophia-Antipolis Cedex; France vol. RAN WG2, No. Athens, Greece. Aug. 16, 2011.

\* cited by examiner

มาริTIME MACHINE-TO-MACHINE (M2M) APPLICATION PRIORITY MANAGEMENT

RELATED APPLICATIONS

This application claims the benefit of priority of U.S. Provisional Patent Application No. 61/898,154, filed on Oct. 31, 2013.

TECHNICAL FIELD

Particular embodiments of the disclosure relate, in general, to wireless communications and, more particularly, to maritime M2M application priority management.

BACKGROUND

There is an evolving need for Machine-to-Machine (M2M) data traffic for sundry devices provided with communication functionality, which can be addressed using mobile standards-based solutions. The ubiquity of such devices has led to the need for access to the same functionality even where conventional terrestrial mobile networks do not reach, which can be accomplished using mobile standards-based network components connected via satellite link. Doing so, however, introduces a number of unique problems that are common across many types of applications.

First, and most obvious, is the fact that it is vital to use satellite bandwidth as efficiently as possible due both to cost and, in some cases, scarcity of bandwidth. The challenge is to serve as many devices as possible in a given amount of bandwidth without overloading the network. Second, specifically in maritime environments, there are radically different legal requirements depending on where a vessel is located. When located in territorial waters (within 12 nautical miles of the territory of a country), a vessel is generally required to have a license to transmit on cellular frequencies. By contrast, when located in international waters (at least 12 nautical miles outside the territory of a country), the vessel may transmit on cellular frequencies without having a license. The different legal requirements can have a substantial impact on cellular traffic patterns as a vessel moves in and out of international waters.

As an example, a ship may transport hundreds or thousands of refrigerated containers. Each refrigerated container may be equipped with an M2M device that periodically sends status information. When the ship is in international waters, the M2M devices send the status information to a base station onboard the ship over cellular frequencies. The base station then communicates the status information to a monitoring system in the telecommunications network via a satellite link. When the ship is in territorial waters, however, such as when the ship is at port, the base station onboard the ship must stop operating in order to comply with legal requirements. In some cases, the M2M devices transmit status information to terrestrial base stations when the ship is at port. However, if the M2M devices are outside coverage of a terrestrial base station or are not allowed to access the terrestrial base station, for example, due to a lack of agreement with the owner of the terrestrial network, the M2M devices may be unable to transmit the status information. In such circumstances, the M2M devices must store a backlog of status information to be sent when cellular service becomes available. The backlog can potentially become quite large depending on factors such as the amount of time that the ship is without cellular service (which in some situations is approximately the same as the amount of time that the ship is at port), the number of M2M devices onboard the ship (which could be on the order of hundreds or thousands), and the frequency/volume of status information that the M2M devices are configured to transmit to the monitoring system.

When a ship leaves port and enters international waters, the onboard base station can resume operation. In response, all of the M2M devices onboard the ship may try to connect to the base station at roughly the same time in an effort to send their accumulated status information, which might overload the limited radio resources on the ship and limited satellite bandwidth. The resulting congestion can lead to very long delays in the delivery of the accumulated status information.

A further problem, in the case of Enhanced General Packet Radio Service (EGPRS) and similar technologies, is that the transport network does not know the priority of the data being carried over it. Thus, high priority data is just as susceptible to long delays as low priority data. For example, a critical alarm, such as the fact that a refrigerator is no longer functioning correctly and requires immediate maintenance, may be delayed while the system deals with voluminous low priority general reports/logs, such as hourly reports concerning the status of each refrigerated container (e.g., the geographical location of the container, the expected time of arrival at a destination port, or other status). Because of the potential delay in sending a critical alarm, the malfunctioning refrigerator may fail to receive the required maintenance in time to save perishable goods contained within.

Current technology also creates a problem in that when the onboard base station resumes operation, all M2M devices within the area may attempt to register. This creates what is known as a "registration storm." During a registration storm, control channels and other system resources will be occupied as devices attempt to register, and many will fail to register due to congestion. Devices will then "back off" a (usually) random period of time and then repeat the attempt to register. This has the effect of tying up system resources, even for registration attempts that are doomed to fail, that could otherwise have been used for transferring high priority data.

SUMMARY

To address the foregoing problem in the prior art, disclosed are systems and methods for managing an outage or congestion condition using recovery mode operation. Particular embodiments relate to a network node for use in a telecommunications network. The network node communicates with a radio access node that communicates application traffic on behalf of machine-to-machine (M2M) devices via a satellite link. The network node stores a plurality of recovery modes. Each recovery mode indicates one or more types of application traffic that M2M devices are or are not allowed to transmit when operating according to that recovery mode. The network node detects a loss of communication across, or congestion on, the satellite link, selects one of the recovery modes, and requests the radio access node to broadcast the selected recovery mode over a 3GPP-based broadcast channel in order to instruct the M2M devices to transmit only application traffic allowed in accordance with the selected recovery mode.

The network node selects a recovery mode based upon any suitable considerations, such as a forecasted, estimated, or measured density of the various types of application traffic, the number of M2M devices onboard the vehicle, or the duration of the loss of communication across, or congestion on, the satellite link. In particular embodiments, the selected recovery mode causes M2M devices to transmit more time critical application traffic before less time critical application traffic when the satellite link is congested. For example, if the types of application traffic include alarm traffic and log traffic, at least one of the recovery modes allows the M2M devices to transmit the alarm traffic but does not allow the M2M devices to transmit the log traffic.

In particular embodiments, if the network node detects a decrease in congestion across the satellite link, it selects a new recovery mode. The new recovery mode allows more types of application traffic than the originally selected recovery mode. The network node then requests the radio access node to broadcast the new recovery mode over the 3GPP-based broadcast channel in order to instruct the M2M devices to transmit only application traffic allowed in accordance with the new recovery mode.

Also disclosed is an M2M device configured to read a recovery mode from a broadcast channel of a radio access node, generate application traffic, and communicate to the radio access node only the types of application traffic allowed in accordance with the recovery mode.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Particular embodiments of the claimed invention relate to a system in which a central controller determines when a large backlog of data is likely to be present. This backlog may be the result of a system outage or a congestion condition. When the backlog reaches a specified threshold, the controller requests the radio network to broadcast a recovery mode. Wireless devices within coverage read the recovery mode from the broadcast information and behave according to the recovery mode.

Recovery modes are new parameters that allow the data backlog to be cleared in order of criticality. In some embodiments, the recovery modes can be defined within the context of existing radio interface standards. As an example, fields that are optional or reserved in the existing radio interface standards may be used for the recovery modes. As another example, parameter values that are unused in the existing radio interface standards (or that are unused in a radio network's implementation of the standard) may be used for the recovery modes.

In general, a recovery mode indicates the types of application traffic that wireless devices are permitted to transmit across a network or sub-network while in that recovery mode. Application traffic generally refers to traffic generated by an application executing on a wireless device. As an example, a container monitoring application executing on an M2M device may generate various types of application traffic, such as alarm traffic that indicates that the container has experienced a refrigeration system failure or other malfunction, general report traffic that provides the container's status on a periodic basis, software upgrade traffic for upgrading functionality of the container monitoring application, and so on.

In some embodiments, a controller selects one of various recovery modes depending on the current level of network congestion. When the network is highly congested, the controller selects a recovery mode that permits wireless devices to transmit high priority application traffic, such as alarm traffic only. The controller can optionally change the recovery mode periodically. For example, the controller may change from a high priority recovery mode to a medium priority recovery mode upon a determination that the current alarm data has been sent and/or congestion has gone down. In some embodiments, the medium recovery mode permits the wireless devices to transmit both alarm data and general status reports. If the controller determines that there is minimal or no congestion or backlog to handle, the controller could change from a recovery mode operation to normal operation. The controller can select/change a recovery mode at any suitable time during normal operation or recovery mode operation.

A beneficial side effect of recovery mode operation includes a reduction in the amount of signaling overhead that will occur during "registration storms" that happen after a network outage. This is especially beneficial because the registration storms consume resources that could be used for transferring high priority information. By staggering registration and data upload, contention and collisions are reduced. This reduction lowers the percentage of the available bandwidth that will be used for signaling overhead, which has the effect of increasing the amount of bandwidth available for applications.

Figure 1:
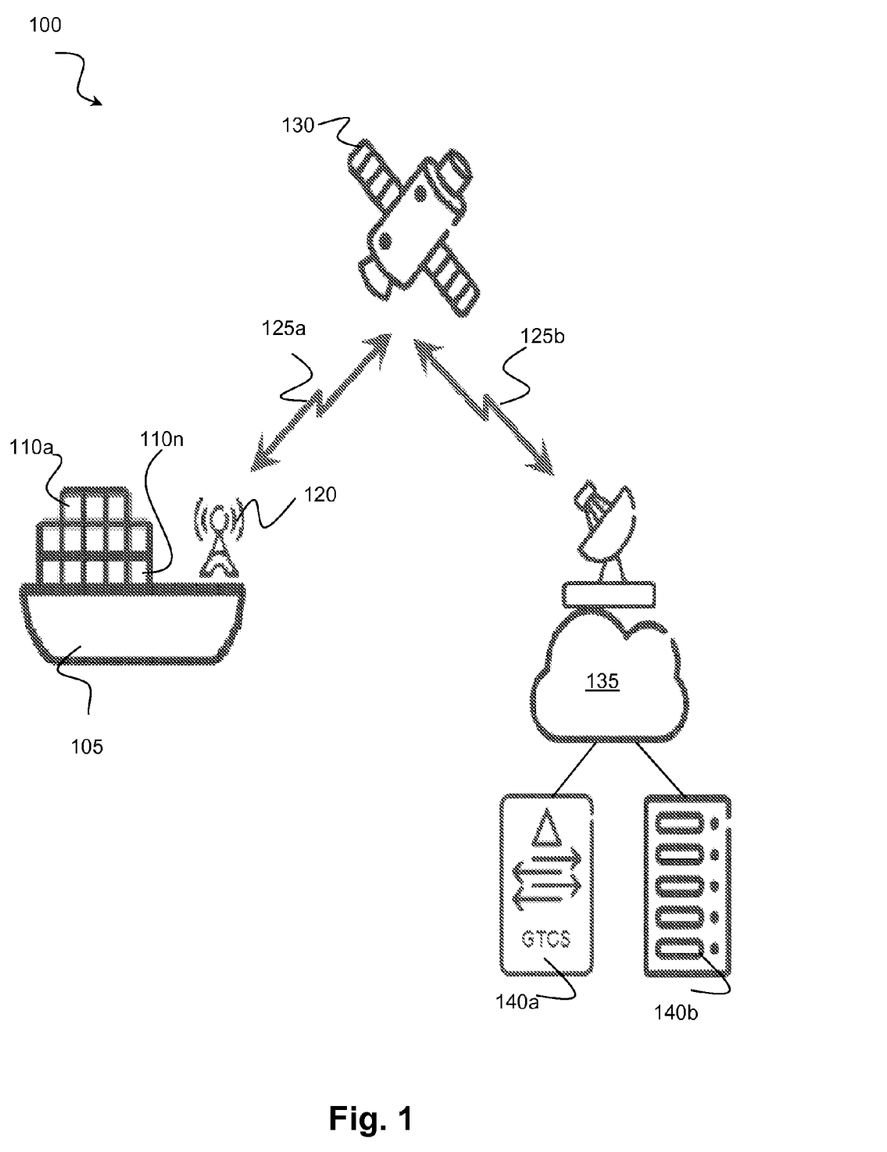
FIG. 1 is a block diagram of an exemplary wireless network.

FIG. 1 is a block diagram of an exemplary wireless network 100. Wireless network 100 includes a plurality of wireless devices 110a-110n and at least one radio access node 120 onboard a vehicle 105. Wireless devices 110a-110n communicate with radio access node 120 over a wireless interface. For example, wireless device 110a transmits wireless signals to radio access node 120 and/or receives wireless signals from radio access node 120. The wireless signals contain application traffic, control signals, and/or other suitable signals.

In some embodiments, radio access node 120 communicates application traffic from wireless devices 110a-110n to a telecommunications network via a satellite backhaul. In particular, radio access node 120 communicates the application traffic to a satellite 130 via a first satellite link 125a. Satellite 130 then communicates the application traffic to one or more network nodes 140 via a second satellite link 125b and optionally an interconnecting network 135. Interconnecting network 135 refers to any interconnecting system capable of transmitting audio, video, signals, data, messages, or any combination of the preceding. Examples of particular embodiments of network node 140, radio access node 120, and wireless device 110 are described with respect to FIGS. 4A-4B, 5A-5B, and 6A-6B, respectively.

As shown in FIG. 1, vehicle 105 may be a ship that carries a number of refrigerated containers (a)-(n). Each wireless device 110a-110n facilitates monitoring a respective refrigerated container. In some embodiments, wireless devices 110a-110n are implemented as M2M devices that execute container monitoring applications. A container monitoring application monitors a refrigerated container and generates various types of application traffic, such as alarm traffic and general report traffic.

The M2M devices communicate the application traffic to a monitoring system 140b in the telecommunications network via radio access node 120, which may be implemented as a cellular base station connected to a satellite backhaul. Monitoring system 140b may refer to one or more network nodes 140 configured to collect the application traffic in a central repository, consolidate the application traffic, analyze the application traffic, process the application traffic, communicate the application traffic to backend systems, and/or provide any other suitable functions.

In some embodiments, the telecommunications network may include a Geo-fencing Tracking and Control System (GTCS) (e.g., network node 140a). GTCS 140a communicates with radio access node 120 onboard vehicle 105 using an operation and maintenance interface that sends signals over the satellite backhaul. The operation and maintenance interface allows GTCS 140a to instruct radio access node 120 to turn its transmitters on and off and to set certain parameters.

As an example, GTCS 140a maintains a map showing where radio access node 120 is and is not allowed to transmit. GTCS 140a tracks the geographical location of vehicle 105 and compares the location to the map. If vehicle 105 moves from a location where radio access node 120 is allowed to transmit (e.g., international waters) to a location where radio access node 120 is not allowed to transmit (e.g., territorial waters), GTCS 140a sends radio access node 120 an instruction to turn off its transmitter. If vehicle 105 moves from a location where radio access node 120 is not allowed to transmit (e.g., territorial waters) to a location where radio access node 120 is allowed to transmit (e.g., international waters), GTCS 140a sends radio access node 120 an instruction to turn on its transmitter.

In some embodiments, GTCS 140a includes new functionality for deciding whether the radio network should use recovery mode operation and which of the various recovery modes should be used. GTCS 140a also includes new functionality for determining the duration of the data recovery period. A module within GTCS 140a processes the decision data in response to specific events. Depending on the outcome of decision, GTCS 140a will issue one or more commands.

As an example, a command may instruct radio access node 120 to reject wireless device-initiated messages and to only allow network-initiated messages. This may help the network to control congestion by using network-initiated message sequences to target only those specific wireless devices 110 that are allowed to send messages during a given time period. For example, network-initiated SMS messages can be used to query wireless devices 110 that are of interest to the network.

As another example, a command may change system information to cause radio access node 120 to broadcast specific system information, such as a specific recovery mode. Examples of recovery modes include, in the order of most critical to least critical, a "send alarm information only" recovery mode, a "send alarm information and filtered or prioritized data backlog" recovery mode, and a "send alarm information and data backlog" recovery mode. Although the preceding examples have been described in terms of data that wireless device 110 is allowed to send, a recovery mode could also be described in terms of data that wireless device 110 is not allowed to send, such as a "reject software and/or firmware downloads" recovery mode.

Once GTCS 140a determines that the system no longer needs to use recovery mode operation, GTCS 140a instructs radio access node 120 to resume "normal operational mode." In some embodiments, radio access node 120 signals normal operation by omitting the recovery mode field from the broadcast information. In some alternative embodiments, radio access node 120 signals normal operation by broadcasting a recovery mode value that has been defined as normal operation.

GTCS 140a uses any suitable data when deciding which command(s) to send to radio access node 120a. Examples include one or more of the following: (1) the transport network has changed, for example, in the maritime context, a ship has entered a specific satellite beam; (2) the mobile network has come back on line preceded by an outage; (3) congestion on the satellite backhaul link; (4) congestion on radio access network resources; and (5) expiry of a system timer, such as a timer configured based on the number of devices that have registered on the ship.

In some embodiments, GTCS 140a determines an amount of time that is to be used for each recovery phase. The amount of time may be determined based on any suitable information, such as one or more of the following: (1) the number of devices affected by the outage/congestion condition, such as the number of wireless devices 110 within coverage of the affected radio access node 120 (e.g., in the specific maritime case described above, the number of container devices onboard vehicle 105); (2) the length of the outage or out-of-coverage condition; (3) the average amount of data that is accumulated over a given period of time; (4) an estimate of the number of alarms that will have accumulated over a given period of time; (5) notification that the satellite backhaul link is no longer congested; and (6) notification that RAN resources are no longer congested.

The recovery period may optionally be repeated so that, for instance, an alarm-only period is followed by a normal operational period, followed by another alarm-only period. In this way, alarms generated during the backlog clearing phase can be sent expeditiously.

A module in wireless device 110, upon reading specific system information from the broadcast information, will order applications executing on wireless device 110 to follow certain rules. For example, the module, upon reading a recovery mode from the broadcast information, will order applications executing on wireless device 110 to operate in accordance with the recovery mode.

In "alarm information only" recovery mode, wireless device 110 sends stored alarm information, if any. In "send alarm information and filtered or prioritized data backlog" recovery mode, wireless device 110 sends any stored alarm information or queued data having sufficiently high priority. Note that this mode allows special handing of data sending. For instance, the device can decide to send stored information on a Last-In-First-Out basis so that the most recent data gets sent first.

In normal operation, wireless device 110 processes data in the normal manner. For example, wireless device 110 can send any type of data, such as alarms, general reports (including recent reports and less recent reports), and software/firmware update related messaging.

Figure 2:
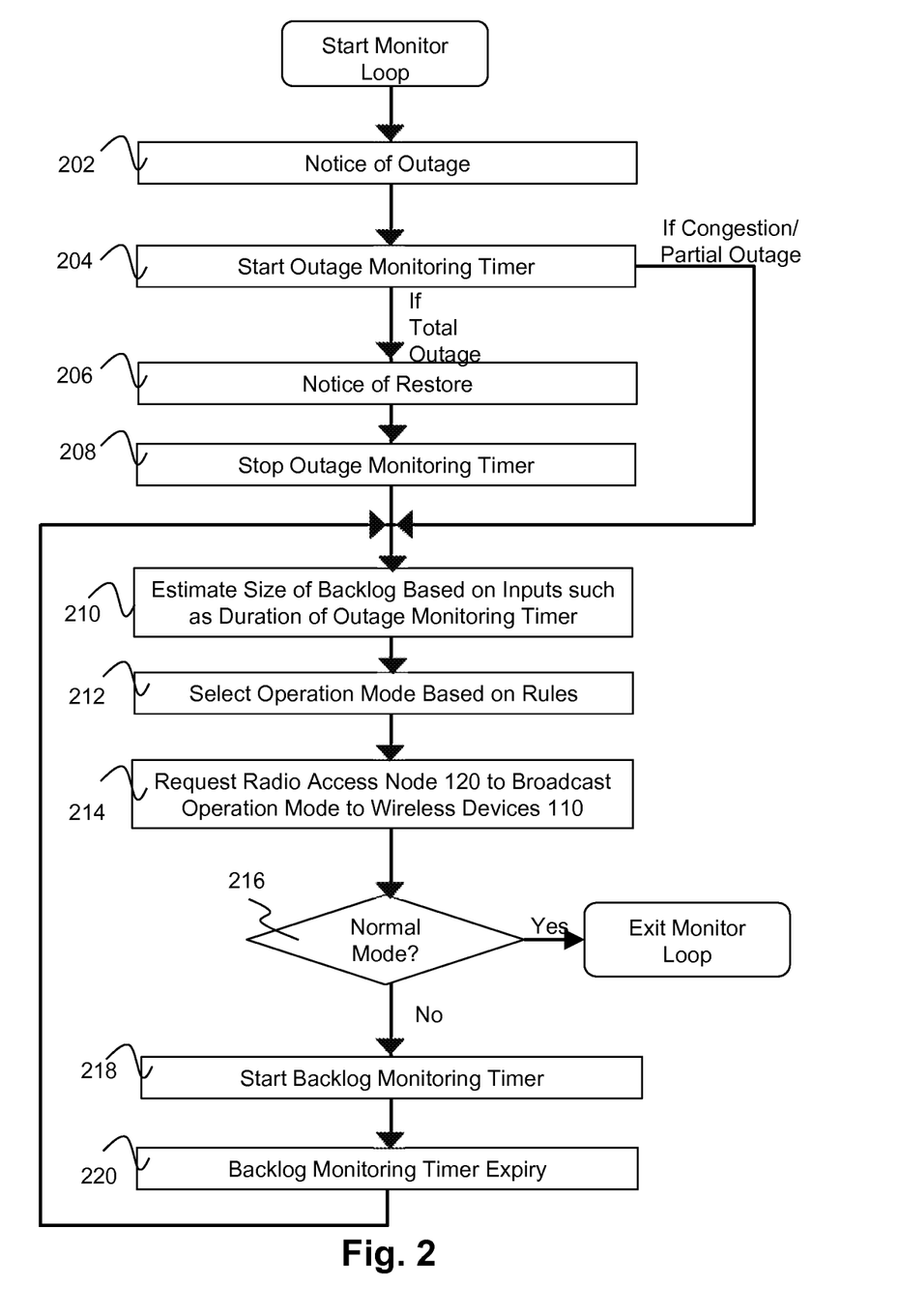
FIG. 2 is a flow chart of a method in a network node in accordance with the principles of the invention.

FIG. 2 is a flow chart of a method in a network node in accordance with the principles of the invention. For example, in some embodiments, a new monitoring routine is added to the network node and is used to make the decision to mandate a recovery period. Any suitable network node may perform the monitoring routine, such as GTCS 140*a* described in the example below. The monitoring routine may monitor the status of a radio network configured according to any suitable radio access technology, such as the GSM network described in the example below.

At step 202, GTCS 140*a* determines that vehicle 105 has an outage. For example, a total outage can occur due to GSM transmission being turned off when vehicle 105 travels within 12 nautical miles of land. As another example, a partial outage can occur due to congestion at radio access node 120 or congestion over the satellite backhaul. At step 204, GTCS 140*a* starts an outage monitoring timer at the beginning of the outage. This is done in order to determine the size of the backlog of wireless devices 110 onboard vehicle 105. Next, the method may either proceed to step 206 in the case of a total outage or skip to step 210 in the case of a partial outage/congestion.

At step 206, GTCS 140*a* determines that the GSM service has been restored on vehicle 105 during the monitoring process. The restoration, for example, can be created due to vehicle 105 traveling beyond 12 nautical miles of land. GTCS 140*a* stops the outage monitoring timer at step 208.

At step 210, GTCS 140*a* consults rules to estimate the size of the backlog based on one or more inputs. Examples of the inputs include the value of the outage monitoring timer, the estimated number of wireless devices 110 onboard vehicle 105, outage percentage (e.g., 100% for complete outage, 50% for congested link), estimated size of highest priority message (e.g., alarms), estimated size of next highest priority message (e.g., logs), and so on.

At step 212, GTCS 140*a* applies the rules and then outputs a selected operation mode. Examples of operation modes include normal operation and various recovery modes. As an example, if at step 210 GTCS 140*a* estimated a large backlog, GTCS 140*a* might select a "send alarm information only" recovery mode. If at step 210 GTCS 140*a* estimated a small backlog, GTCS 140*a* might select a "send alarm information and filtered or prioritized data backlog" recovery mode. The output of the rules may optionally include a backlog monitoring timer value indicating how long to use the selected recovery mode.

At step 214, GTCS 140*a* issues a command that requests radio access node 120 to operate according to the operation mode selected at step 212. For example, GTCS 140*a* could request radio access node 120 to broadcast the "send alarm information only" recovery mode to handle a large backlog or to broadcast the "send alarm information and filtered or prioritized data backlog" to handle a smaller backlog. GTCS 140*a* could request radio access node 120 to omit an operation mode from the broadcast information or to broadcast a "normal operation" mode when it is ready to restore normal operation, such as once the backlog has been sufficiently cleared.

At step 216, GTCS 140*a* checks whether the current operation mode corresponds to normal mode or one of the recovery modes. If the current operation mode corresponds to normal mode, GTCS 140*a* exits the monitoring loop. If the current operation mode corresponds to one of the recovery modes, GTCS 140*a* proceeds to step 218 and starts the backlog monitoring timer.

The backlog monitoring timer indicates the amount of time to operate at the current recovery mode. As discussed above, GTCS 140*a* uses one or more inputs to the rules (step 210) to determine the value of the backlog monitoring timer (step 212). Thus, the value of the backlog monitoring timer may vary depending on network conditions. For example, the backlog monitoring timer value may be relatively large to handle a large backlog and relatively small to handle a small backlog.

At step 220, the backlog monitoring timer expires and, in response, GTCS 140*a* returns to step 210 to reassess the size of the backlog. GTCS 140*a* applies the rules and can change the operation mode at step 212, for example, if the size of the backlog/the amount of congestion has been reduced. As an example, GTCS 140*a* may change from the "send alarm information only" recovery mode to the "send alarm information and data backlog" recovery mode. Steps 210-220 may be repeated until GTCS 140*a* has restored normal operation.

Figure 3:
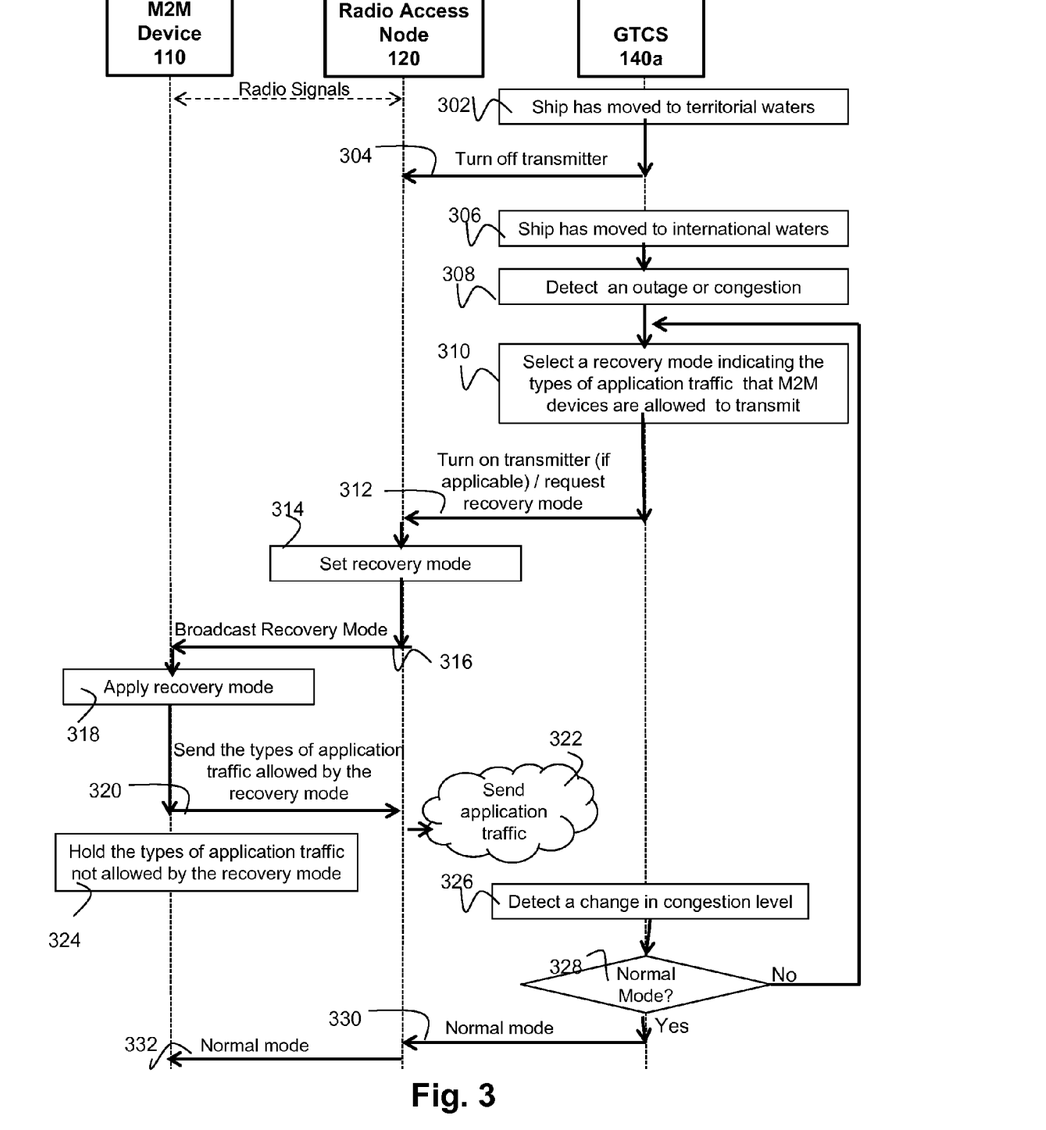
FIG. 3 is a signaling diagram of an exchange of signals in accordance with the principles of the invention.

FIG. 3 is a signaling diagram of an exchange of signals in accordance with the principles of the invention. More specifically, FIG. 3 illustrates communications between a wireless device 110 (such as an M2M device), a radio access node 120 (such as a cellular base station), and a network node (such as a GTCS 140*a* or other suitable controller). In general, in response to a failure recovery or congestion condition, radio access node 120 configures a broadcast channel to transmit one of a plurality of recovery modes. Wireless device 110 reads the recovery mode from the broadcast channel and operates according to the recovery mode. Each recovery mode indicates one or more types of application traffic that wireless devices 110 are or are not allowed to transmit when operating according to that recovery mode. Thus, wireless device 110 does not transmit the type(s) of application traffic that the current recovery mode does not allow.

In some embodiments, these general functions may be implemented as follows. When the procedure begins, a radio access node 120 onboard a ship can communicate cellular signals with wireless device 110. At step 302, GTCS 140*a* detects that the ship has moved into territorial waters. For example, GTCS 140*a* compares geographical coordinates of the ship's location to a map indicating the location of international waters (where laws allow radio access node 120 to transmit on cellular frequencies) and territorial waters (where laws prohibit radio access node 120 from transmitting on cellular frequencies without a license). In response to detecting that the ship has moved into territorial waters, GTCS 140*a* sends a command to radio access node 120 to turn off its transmitter at step 304. Radio access node 120 ceases sending and receiving cellular signals from wireless devices 110. In some situations, radio access node 120 stops transmitting for long periods of time, such as hours or days while the ship is at port.

At step 306, GTCS 140*a* detects that the ship has returned to international waters. At step 308, GTCS 140*a* detects the occurrence of an outage, such as a loss of communication across or congestion on the satellite link that connects radio access node 120 to the telecommunications network. As an example, in some embodiments, GTCS 140*a* determines the occurrence of a loss of communication across the satellite link based on having instructed radio access node 120 to turn off its transmitter at step 304. As another example, GTCS 140*a* may determine the occurrence of congestion across the satellite link based on a congestion status message received from radio access node 120 or from another network node. For example, in some embodiments, monitoring system 140*b* sends GTCS 140*a* a congestion status message if the monitoring system 140*b* detects low throughput of application traffic from radio access node 120.

Although FIG. 3 illustrates the outage as occurring after a period of time that radio access node 120 has stopped transmitting, in other embodiments, the outage could occur for other reasons, such as lack of available resources from satellite 130, lack of directional alignment between radio access node 120 and satellite 130, or a spike in application traffic (such as may occur if all of the wireless devices 110 attempt to send a detailed daily report at the same time, for example, at midnight).

At step 310, GTCS 140a selects one of a plurality of recovery modes. Each recovery mode indicates one or more types of application traffic that wireless devices 110 (e.g., M2M devices) are or are not allowed to transmit while operating according to the recovery mode. The selection of the recovery mode allows wireless devices 110 to transmit more time critical application traffic (e.g., alarms) before less time critical application traffic (e.g., logs) during times of congestion/outage recovery. In particular embodiments, this may be accomplished by configuring a recovery mode that allows alarm traffic but does not allow log traffic for a period of time. Thus, the use of recovery modes allows for traffic transmitted by wireless devices 110 to be prioritized at the application level.

GTCS 140a selects the recovery mode based on one or more inputs, such as outage duration; estimated or measured number of wireless devices 110 onboard the ship; outage percentage (e.g., 100% for complete outage, 50% for congested link); forecasted, estimated, or measured size or density of each of the various types of application traffic; or other information indicative of the size of the backlog and/or degree of congestion. In some embodiments, certain inputs may be received or determined from information provided by other network nodes, such as radio access node 120 or monitoring system 140b. As an example, monitoring system 140b may provide information for forecasting, estimating, or measuring the size or density of highest priority application traffic (e.g., alarms), next highest priority application traffic (e.g., logs), and so on.

At step 312, GTCS 140a sends one or more commands to radio access node 120. In the illustrated example, GTCS 140a sends a command for radio access node 120 to turn on its transmitter because GTCS 140a previously determined that the ship moved from territorial waters to international waters (see step 306). At step 312, GTCS 140a also sends a command that includes the selected recovery mode because GTCS 140a previously detected an outage, such as loss of communication across or congestion on the satellite link, and selected the recovery mode (steps 308-310). Sending the recovery mode indicates to radio access node 120 to broadcast the recovery mode over a 3GPP-based broadcast channel in order to instruct wireless devices 110 to transmit only application traffic allowed in accordance with the recovery mode.

The commands described with respect to step 312 can be sent in one or more messages and in any suitable order. Thus, GTCS 140a can send the recovery mode before, after, or at the same time that it commands radio access node 120 to turn on its transmitter. In addition, for scenarios in which radio access node 120's transmitter is already on, GTCS 140a need not send radio access node 120 a command to turn on its transmitter. For example, as further described below, GTS 140a may send radio access node 120 a command to change from an originally selected recovery mode to a new recovery mode without having to command radio access node 120 to turn on its transmitter.

At step 314, radio access node 120 sets the recovery mode received from GTCS 140a. At step 316, radio access node 120 turns on its transmitter (if the transmitter is not already on) and broadcasts the recovery mode to wireless devices 110. In some embodiments, radio access node 120 broadcasts the recovery mode in addition to broadcasting access priority information, such as access class information.

In general, wireless devices 110 can be divided into a number of access classes. In a typical network, ordinary case wireless devices 110 are provisioned with a random access class between 0 and 9, and special case wireless devices 110 are provisioned with an access class between 10 and 15 for use in special cases, such as emergency services, official government use, etc. To restrict certain wireless devices 110 from accessing radio access node 120, radio access node 120 broadcasts to wireless devices 110 an indication of which access class(es) radio access node 120 allows. Wireless devices 110 provisioned with the allowed access classes can access radio access node 120, while wireless devices 110 provisioned with other access classes are not allowed to access radio access node 120.

In certain circumstances, radio access node 120 uses the access class configuration to reduce the number of wireless devices 110 permitted to access radio access node 120. Reducing the number of wireless devices 110 can reduce congestion. Examples of proposed congestion control mechanisms based on the use of access class include implicit reject and non-access stratum (NAS) signaling low priority. Congestion control mechanisms based on access class assume a relatively even distribution of access class assignments across wireless devices 110, such as approximately 10% provisioned in access class 0, 10% provisioned in access class 1, ... and 10% configured in access class 9. Thus, when radio access node 120 allows one access class, about 10% of the traffic is expected to be allowed, when radio access node 120 allows two access classes, about 20% of the traffic is expected to be allowed, and so on.

The use of access classes may be insufficient to control congestion in certain circumstances. For example, in certain maritime environments, a special access class is assigned to a ship's private network. Rather than randomly assigning the wireless devices 110 across a number of access classes, all wireless devices 110 onboard the ship are assigned to the same access class. That is, the access class is used as a means to distinguish wireless devices 110 that are allowed to access the ship's private network from nearby wireless devices 110 (such as wireless devices on nearby ships) that are not allowed to access the ship's private network. In such environments, disallowing the single, shared access class is not useful to control congestion because none of the wireless devices 110 would be able to access radio access node 120. Furthermore, once radio access node 120 re-allows the shared access class, all of the wireless devices 110 would attempt to access radio access node 120 at the same time, thereby causing congestion.

Another limitation of access class-based congestion control is that it occurs at the device level. For example, suppose a first wireless device 110a is in access class 0 and needs to transmit a critical alarm. Suppose a second wireless device 110b is in access class 1 and has no alarms to transmit. Radio access node 120 has no knowledge of the types of application traffic that specific wireless devices 110a and 110b need to transmit. Suppose radio access node 120 randomly selects to allow access class 1 and disallow access class 0 during congestion. As a result, the first wireless device 120a cannot send its critical alarm in a timely manner even though lower priority traffic from the second wireless device 120b gets transmitted.

Certain embodiments of the disclosure address the problems with access class-based congestion control by providing recovery modes that allow for controlling congestion at the application level, rather than the device level.

In some embodiments, recovery mode-based congestion control can be combined with access class controls. For example, the access class can be used to allow only those devices assigned to a private, maritime network, and the recovery mode can be used for congestion control. As another example, suppose wireless devices 110 assigned randomly across access classes 0-9 need to send a volume of alarm data and log data that would cause congestion. Radio access node 120 could broadcast access class 0 with a "send alarm information only" recovery mode for a period of time to clear some of the congestion, then broadcast access class 1 with the "send alarm information only" recovery mode for a period of time, and so on such that congestion is controlled based on both the device and the types of application traffic being transmitted.

Returning to step 316 of FIG. 3, wireless communication device 110 reads the recovery mode broadcast by radio access node 120. At step 318, wireless device 110 applies the recovery mode. At step 320, wireless communication device 110 sends the types of application traffic allowed by the recovery mode, such as alarm traffic. At step 322, radio access node 120 sends the received application traffic to monitoring system 140*b* (or other destination node) via satellite 130. At step 324, wireless device 110 holds the types of application traffic not allowed by the recovery mode, such as log traffic.

After a period of time, GTCS 140*a* detects a change in the level of congestion across the satellite link (step 326). For example, GTCS 140*a* detects a decrease in congestion across the satellite link. In some embodiments, GTCS 140*a* determines congestion has decreased in response to expiry of a backlog monitoring timer. In some embodiments, other inputs can be used to detect the decrease in congestion, such as one or more of outage duration; recovery period duration; estimated or measured number of wireless devices 110 onboard the ship; outage percentage (e.g., 100% for complete outage, 50% for congested link); forecasted, estimated, or measured size or density of each of the various types of application traffic; or other information indicative of the size of the backlog and/or degree of congestion.

At step 328, GTCS 140*a* determines if congestion has sufficiently decreased in order to restore normal operation. If congestion has not sufficiently decreased, GTCS 140*a* returns to step 310 to select a new recovery mode. The new recovery mode may allow more types of application traffic than the originally selected recovery mode. For example, if the originally selected recovery mode allows only alarm traffic, the new recovery mode may allow alarm traffic plus log traffic (or some subset of log traffic, such as the most recent log traffic). Steps analogous to steps 310-328 are repeated until normal operation has been restored. If at step 328 GTCS 140*a* determines that congestion has cleared/sufficiently decreased, GTCS 140*a* instructs radio access node 120 to resume normal operation at step 330. In response, radio access node 120 indicates to M2M device 110 to resume normal operation at step 332. For example, in certain embodiments, radio access node 120 may broadcast a normal mode indicator. In certain alternative embodiments, radio access node 120 stops broadcasting a recovery mode, and M2M device 110 understands the absence of a recovery mode to indicate that normal operation should be used.

As described with respect to FIG. 1, embodiments of network 100 can include one or more wireless devices 110, and one or more different types of network nodes capable of communicating (directly or indirectly) with wireless devices 110. Examples of the network nodes include radio access nodes 120 and network nodes 140. The network may also include any additional elements suitable to support communication with wireless devices 110.

Wireless device 110, radio access node 120, and network node 140 use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies. The scope of the disclosure, however, is not limited to the examples and other embodiments could use different radio access technologies. Each of wireless device 110, radio access node 120, and network node 140 include any suitable combination of hardware and/or software. Examples of particular embodiments of network node 140, radio access node 120, and wireless device 110 are described with respect to FIGS. 4A-4B, 5A-5B, and 6A-6B, respectively.

Figure 4A:
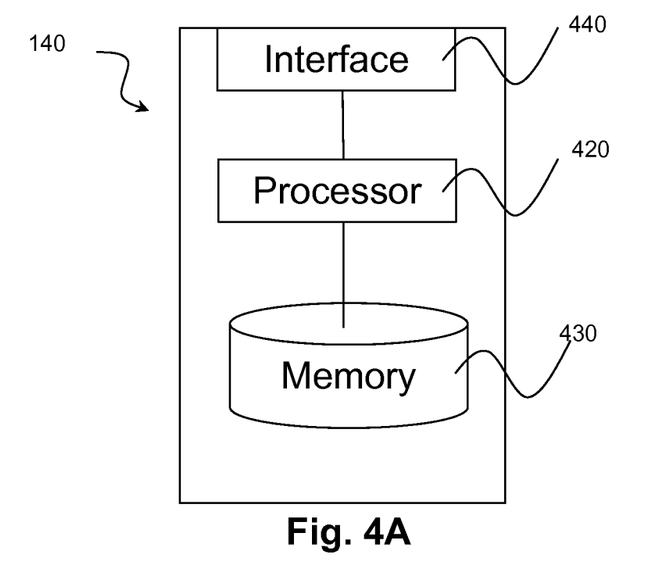
FIG. 4A is a block schematic of an exemplary network node suitably operative in accordance with the principles of the invention.

FIG. 4A is a block schematic of an exemplary network node 140 suitably operative in accordance with the principles of the invention. In general, network node 140 may refer to any suitable node in the telecommunications network infrastructure that communicates directly or indirectly with radio access node 120. Examples of network node 140 include, but are not limited to, a node associated with the radio access network (e.g., GTCS 140*a*, monitoring system 140*b*, or a radio network controller, such as a base station controller) or a node associated with the core network. The network node includes processor 420, memory 430, and network interface 440. Processor 420 executes instructions to provide some or all of the functionality described above as being provided by a network node, such as GTCS 140*a*; memory 430 stores the instructions executed by processor 420; and network interface 440 communicates signals to other network nodes.

Processor 420 includes any suitable combination of hardware and software implemented in one or more integrated circuits or modules to execute instructions and manipulate data to perform some or all of the described functions of the network node. Memory 430 is generally operable to store computer executable code and data. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 440 is communicatively coupled to processor 420 and may refer to any suitable device operable to receive input for the network node, send output from the network node, perform suitable processing of the input or output or both, communicate to other nodes, or any combination of the preceding. Network interface 440 includes appropriate hardware (e.g., port, modem, network interface card, etc.) and software, including protocol conversion and data processing capabilities, to communicate through a network.

Other embodiments of the network node include additional components (beyond those shown in FIG. 4A) responsible for providing certain aspects of the network node's functionality, including any of the functionality described above and/or any additional functionality (including any functionality necessary to support the solution described above).

Figure 4B:
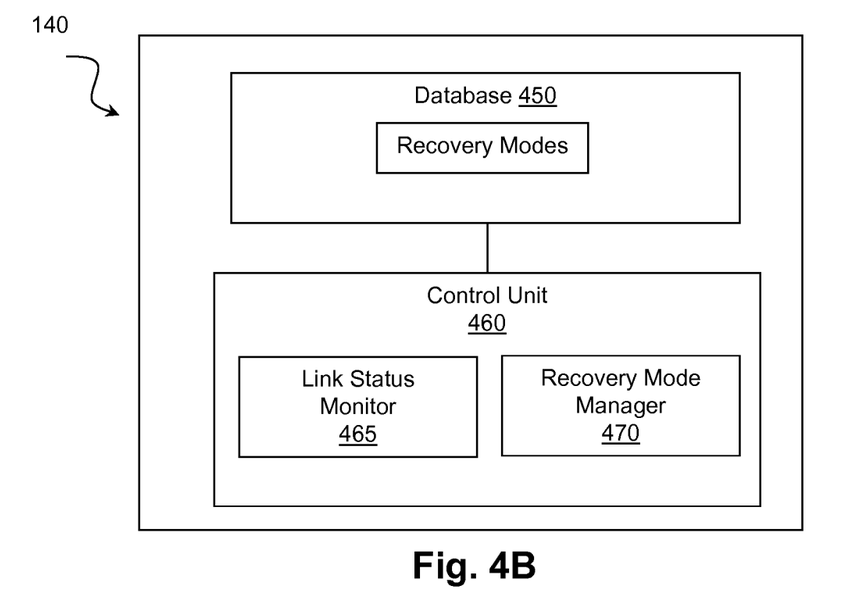
FIG. 4B is a block schematic of components of a network node suitably operative in accordance with the principles of the invention.

FIG. 4B is a block schematic of components of a network node, such as GTCS 140*a* or a radio network controller, suitably operative in accordance with the principles of the invention. The network node includes database 450 and control unit 460. In some embodiments, database 450 may be stored in memory 430 and control unit 460 may be implemented using one or more processors 420 of FIG. 4A.

Database 450 stores a plurality of recovery modes. Each recovery mode indicates one or more types of application traffic that M2M devices are or are not allowed to transmit when operating according to that recovery mode.

Control unit 460 includes a link status monitor 465 and a recovery mode manager 470. Link status monitor 465 detects a loss of communication across, or congestion on, the satellite link that connects wireless devices 110 onboard vehicle 105 to the telecommunications network. As an example, link status monitor 465 may perform steps 202-208 described with respect to FIG. 2 or step 308 described with respect to FIG. 3. Link status monitor 465 informs recovery mode manager 470 about the loss of communication across, or congestion on, the satellite link.

Recovery mode manager 470 selects one of the plurality of recovery modes and requests radio access node 120 onboard vehicle 105 to broadcast the selected recovery mode over a 3GPP-based broadcast channel in order to instruct the wireless devices 110 to transmit only application traffic allowed in accordance with the selected recovery mode. As an example, recovery mode manager may perform steps 210-220 described with respect to FIG. 2 or steps 310-312 described with respect to FIG. 3.

Figure 5A:
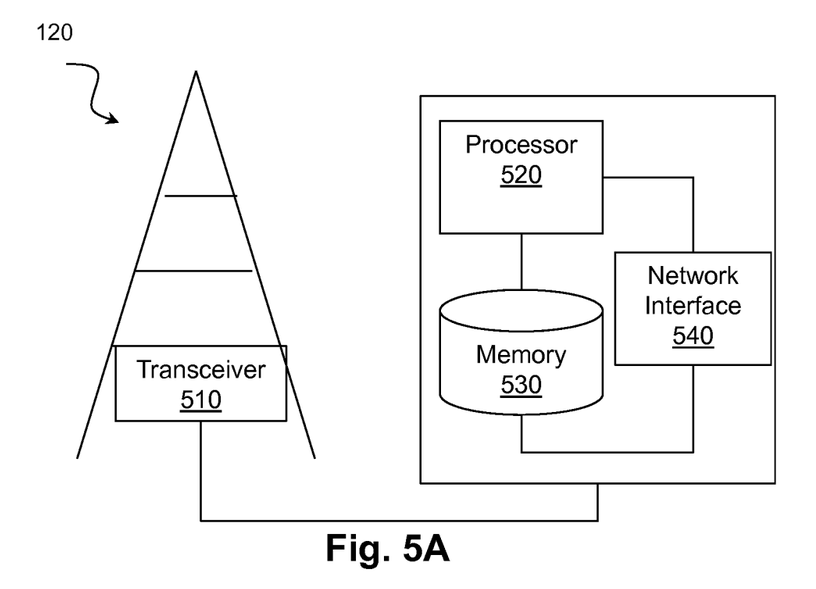
FIG. 5A is a block schematic of an exemplary radio access node suitably operative in accordance with the principles of the invention.

FIG. 5A is a block schematic of an exemplary radio access node 120 suitably operative in accordance with the principles of the invention. Radio access node 120 can be, for example, an eNodeB, a node B, a base station, a wireless access point (e.g., a Wi-Fi access point), a low power node, a base transceiver station (BTS), a transmission point or node, a remote RF unit (RRU), or a remote radio head (RRH). In some embodiments, radio access node 120 can be a type of network node 140 (e.g., a network node 140 configured with a transceiver 510). Thus, in some embodiments, radio access node 120 may be the node that performs certain functionality of a network node 140, such as selecting a recovery mode.

Radio access node 120 includes at least one transceiver 510, at least one processor 520, at least one memory 530, and at least one network interface 540. Transceiver 510 facilitates transmitting wireless signals to and receiving wireless signals from wireless device 110 (e.g., via an antenna); processor 520 executes instructions to provide some or all of the functionality described above as being provided by a radio access node 120; memory 530 stores the instructions executed by processor 520; and network interface 540 communicates signals to backend network components, such as a gateway, switch, router, Internet, Public Switched Telephone Network (PSTN), other radio access nodes 120, and/or network nodes 140. The processor 520 and memory 530 can be of the same types as described supra with respect to FIG. 4A.

In some embodiments, network interface 540 is communicatively coupled to processor 520 and refers to any suitable device operable to receive input for radio access node 120, send output from radio access node 120, perform suitable processing of the input or output or both, communicate to other devices, or any combination of the preceding. Network interface 540 includes appropriate hardware (e.g., port, modem, network interface card, etc.) and software, including protocol conversion and data processing capabilities, to communicate through a network.

Other embodiments of radio access node 120 include additional components (beyond those shown in FIG. 5A) responsible for providing certain aspects of the radio access node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Figure 5B:
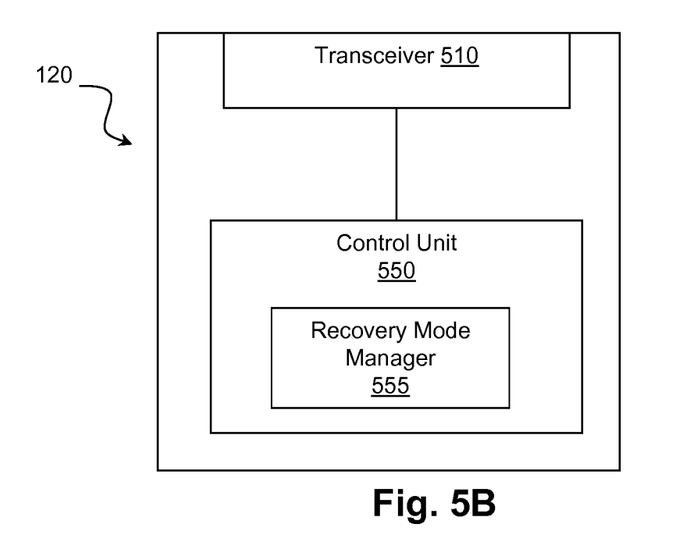
FIG. 5B is a block schematic of components of a radio access node suitably operative in accordance with the principles of the invention.

FIG. 5B is a block schematic of components of a radio access node 120 suitably operative in accordance with the principles of the invention. Radio access node 120 may include a transceiver 510 and a control unit 550. Transceiver 510 may be of the type described with respect to FIG. 5A and may be configured to broadcast a recovery mode to wireless devices 110 within coverage of radio access node 120. The recovery mode indicates one or more types of application traffic that wireless devices 110 are or are not allowed to transmit when operating according to that recovery mode.

A recovery mode manager 555 within radio access node 120's control unit 550 sets the recovery mode. In some embodiments, recovery mode manger 555 sets the recovery mode in response to a command from another network node, such as a GTCS 140a that monitors the network for an outage or congestion condition and selects a suitable recovery mode. In certain alternative embodiments, control unit 550 itself could detect an outage or congestion condition and select one of the recovery modes based on factors such as the duration of the outage or congestion condition, the estimated number of wireless devices 110 within its coverage, and so on. By setting the recovery mode, control unit 550 requests transceiver 510 to broadcast the recovery mode over a 3GPP-based broadcast channel. In some embodiments, control unit 550 may be implemented using one or more processors 520 of FIG. 5A.

Figure 6A:
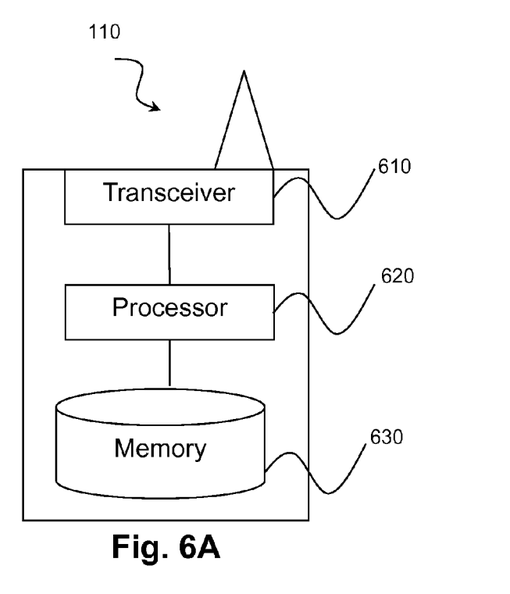
FIG. 6A is a block schematic of an exemplary wireless device suitably operative in accordance with the principles of the invention; and, FIG. 6B is a block schematic of components of a wireless device suitably operative in accordance with the principles of the invention.

FIG. 6A is a block schematic of an exemplary wireless device 110 suitably operative in accordance with the principles of the invention. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication.

Wireless device 110 includes transceiver 610, processor 620, and memory 630. In some embodiments, transceiver 610 facilitates transmitting wireless signals to and receiving wireless signals from radio access node 120 (e.g., via an antenna), processor 620 executes instructions to provide some or all of the functionality described herein as provided by a wireless device 110, and memory 630 stores the instructions executed by processor 620. The processor 620 and memory 630 can be of the same types as described supra with respect to FIG. 4A. Other embodiments of wireless device 110 include additional components (beyond those shown in FIG. 6A) responsible for providing certain aspects of the wireless device's functionality, including any of the functionality described above and/or any additional functionality (including any functionality necessary to support the solution described above).

Figure 6B:
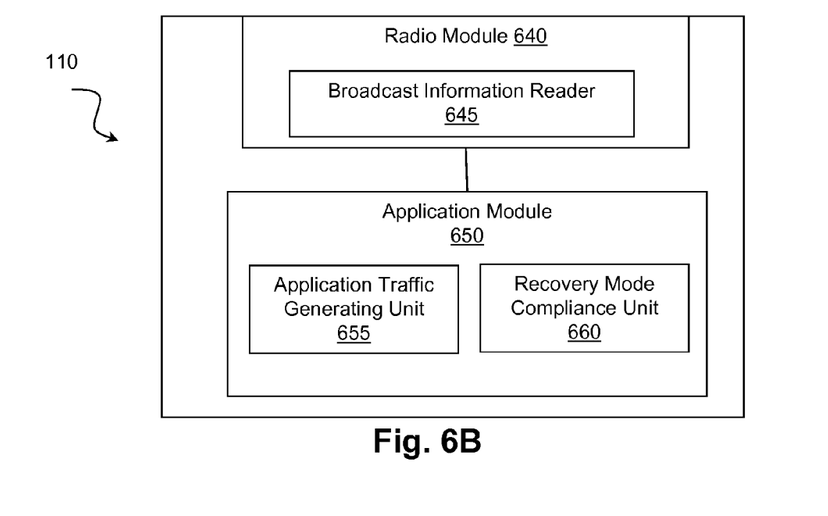

FIG. 6B is a block schematic of components of a wireless device 110 suitably operative in accordance with the principles of the invention. In some embodiments, wireless device 110 includes a radio module 640 and an application module 650. Radio module 640 receives broadcast information and other radio signals from radio access node 120 via transceiver 610. A broadcast information reader 645 of radio module 640 reads the recovery mode (if present) from the broadcast information. The recovery mode indicates one or more types of application traffic that wireless device 110 is or is not allowed to transmit when operating according to that recovery mode. Radio module 640 communicates the recovery mode to application module 650.

Application module 650 includes an application traffic generating unit 655 and a recovery mode compliance unit 660. Application traffic generating unit 655 executes an application that generates the various types of application traffic. As an example, in some embodiments, application traffic generating unit 655 executes a container monitoring application that generates alarm traffic when the monitored container experiences a refrigeration system failure or other malfunction, general report traffic that provides the container's status on a periodic basis, software upgrade traffic for upgrading functionality of the container monitoring application, and so on.

Recovery mode compliance unit 660 receives the various types of application traffic from application traffic generating unit 655 and communicates a subset of the application traffic to radio module 640 for transmission to the radio access node 120 via transceiver 610. The subset of the application traffic excludes the type of application traffic that is not allowed by the recovery mode. For example, if the recovery mode corresponds to "send alarm information only," the subset of application traffic excludes general reports and other non-alarm information.

In some embodiments, radio module 640 and application module 650 may be implemented using one or more processors 620 of FIG. 6A.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set. Modifications, additions, or omissions also may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. For example, while this disclosure uses the case of a maritime network as an example, including specific details regarding such a network supporting M2M communications, it should be understood that the principles can be generalized to any radio network for which it may be desirable to prioritize the types of application traffic that devices are allowed to send when the network is recovering from an outage or congestion condition. Accordingly, the above description of the embodiments does not constrain this disclosure. Other changes, substitutions, and alterations are possible without departing from the spirit and scope of this disclosure, as defined by the following claims.

The invention claimed is:

1. A network node for use in a telecommunications network, the network node capable of communicating with a radio access node located onboard a vehicle, wherein the radio access node communicates via a satellite link in order to communicate application traffic on behalf of machine-to-machine (M2M) devices onboard the vehicle, the network node comprising:

a database that stores a plurality of recovery modes, wherein each recovery mode indicates one or more types of application traffic that the M2M devices are or are not allowed to transmit when operating according to that recovery mode; and a control unit configured to:
detect a loss of communication across, or congestion on, the satellite link;
select one of the plurality of recovery modes in response to detecting the loss of communication across, or congestion on, the satellite link; and,
request the radio access node to broadcast the selected recovery mode over a 3GPP-based broadcast channel in order to instruct the M2M devices to transmit only application traffic allowed in accordance with the selected recovery mode.

2. The network node of claim 1, wherein the control unit selects the recovery mode based upon a forecasted, estimated, or measured density of the various types of application traffic.

3. The network node of claim 1, wherein the control unit selects the recovery mode based at least in part on the number of M2M devices onboard the vehicle or the duration of the loss of communication across, or congestion on, the satellite link.

4. The network node of claim 1, wherein the control unit is further configured to:
select a new recovery mode in response to detecting a decrease in congestion across the satellite link, wherein the new recovery mode allows more types of application traffic than the originally selected recovery mode; and,
request the radio access node to broadcast the new recovery mode over the 3GPP-based broadcast channel.

5. The network node of claim 1, wherein the configuration of the recovery modes causes the M2M devices to transmit more time critical application traffic before less time critical application traffic when the satellite link is congested.

6. The network node of claim 1, wherein the types of application traffic include alarm traffic and log traffic and at least one of the recovery modes allows the M2M devices to transmit the alarm traffic but does not allow the M2M devices to transmit the log traffic.

7. A method in a network node for handling a loss of communication across, or congestion on, a satellite link through which a radio access node located onboard a vehicle communicates application traffic on behalf of machine-to-machine (M2M) devices onboard the vehicle, the method comprising the steps of:

detecting a loss of communication across, or congestion on, the satellite link;
selecting one of a plurality of recovery modes in response to detecting the loss of communication across, or congestion on, the satellite link, wherein each recovery mode indicates one or more types of application traffic that the M2M devices are or are not allowed to transmit when operating according to that recovery mode; and,
requesting the radio access node to broadcast the selected recovery mode over a 3GPP-based broadcast channel in order to instruct the M2M devices to transmit only application traffic allowed in accordance with the selected recovery mode.

8. The method claim 7, wherein the recovery mode is selected based upon a forecasted, estimated, or measured density of the various types of application traffic.

9. The method of claim 7, wherein the recovery mode is selected based at least in part on the number of M2M devices onboard the vehicle or the duration of the loss of communication across, or congestion on, the satellite link.

10. The method of claim 7, further comprising:
selecting a new recovery mode in response to detecting a decrease in congestion across the satellite link, wherein the new recovery mode allows more types of application traffic than the originally selected recovery mode; and, requesting the radio access node to broadcast the new recovery mode over the 3GPP-based broadcast channel.

11. The method of claim 7, wherein the configuration of the recovery modes causes the M2M devices to transmit more time critical application traffic before less time critical application traffic when the satellite link is congested.

12. The method of claim 7, wherein the types of application traffic include alarm traffic and log traffic and at least one of the recovery modes allows the M2M devices to transmit the alarm traffic but does not allow the M2M devices to transmit the log traffic.

13. A machine-to-machine (M2M) device for use onboard a vehicle, the M2M device capable of transmitting various types of application traffic to a radio access node onboard the vehicle for communication via a satellite link, the M2M device comprising a radio module and an application module, wherein:
the radio module is configured to:
read a recovery mode from a broadcast channel of the radio access node, the recovery mode corresponding to one of a plurality of recovery modes, wherein each recovery mode indicates one or more types of application traffic that the M2M device is or is not allowed to transmit when operating according to that recovery mode; and
communicate the recovery mode to the application module;
the application module is configured to:
generate the application traffic; and,
communicate to the radio module for transmission to the radio access node only the types of application traffic allowed in accordance with the recovery mode.

14. A method in a machine-to-machine (M2M) device for transmitting application traffic to a radio access node onboard a vehicle, the method comprising:
reading a recovery mode from a broadcast channel of the radio access node, the recovery mode corresponding to one of a plurality of recovery modes, wherein each recovery mode indicates one or more types of application traffic that the M2M device is or is not allowed to transmit when operating according to that recovery mode;
generating the application traffic; and,
communicating to the radio access node only the types of application traffic allowed in accordance with the recovery mode.

* * * * *